Sept. 4, 1973  R. A. PHANEUF  3,756,800
APPARATUS FOR FORMING A DOUBLY CLAD GLASS MONOFIBER
ELEMENT HAVING A LOW VISCOSITY OUTER CLADDING
Original Filed Oct. 29, 1970  2 Sheets-Sheet 1

SUBSTITUTE FOR MISSING XR

United States Patent Office 3,756,800
Patented Sept. 4, 1973

3,756,800
APPARATUS FOR FORMING A DOUBLY CLAD GLASS MONOFIBER ELEMENT HAVING A LOW VISCOSITY OUTER CLADDING
Roland A. Phaneuf, RFD #1, Simpson St., Sturbridge, Mass. 01566
Original application Oct. 29, 1970, Ser. No. 85,204. Divided and this application Sept. 11, 1972, Ser. No. 288,198
Int. Cl. C03b 23/20
U.S. Cl. 65—156
7 Claims

ABSTRACT OF THE DISCLOSURE

A glass core is assembled in a glass cladding tube and a plurality of rods of low viscosity glass is fused at regular intervals around the outside of the cladding tube. The fusing process occurs at the mono drawing stage. The assembly is drawn through a ring in the drawing furnace immediately subsequent to the point where the cladding tube is collapsed against the core by a vacuum which is drawn between the cladding and core. In this manner, the rods are forced against the cladding tube, thereby fusing the rods on the surface of the cladding.

CROSS-REFERENCES TO RELATED APPLICATIONS

This is a division, of application Ser. No. 85,204, filed Oct. 29, 1970.

BACKGROUND OF THE INVENTION

The present invention relates generally to fiber optic devices and more particularly to a method for applying a low viscosity cladding glass to a glass mono fiber element.

A known method of producing a doubly clad mono fiber is to form glass strips of the desired dimension and configuration. These strips are assembled around the core glass, the core with the strips is assembled into a cladding tube, and the assembly is drawn into a mono fiber. This method is often referred to as the skirt method and is described in U.S. Pat. 3,278,283 by Bazinet and assigned to the assignee of the present application. A disadvantage of the method is that the strips must be of a viscosity which substantially matches that of the assembly. It also requires many interface fusings which are likely to cause bubbles which contribute to blemishes in the final fiber optic product, in both solid and flexible devices.

SUMMARY OF THE INVENTION

According to the present invention, there is provided a method for producing a doubly clad glass mono fiber which is comprised of the steps of assembling a core glass into an outer cladding glass tube and positioning a plurality of low viscosity glass rods regularly around the exterior of the cladding tube. The assembly is inserted into a drawing furnace and a vacuum is applied to the annular space between the core and the tube. When the assembly reaches fusion temperatures, the cladding tube collapses and fuses onto the core. The assembly is then passed through a device which forces the rods into fusion contact with the cladding. Subsequently, the fused assembly is drawn into a doubly clad glass mono fiber element.

This procedure is accomplished in a drawing furnace which includes a means for forcing the rods into contact with the cladding. This is accomplished in the preferred embodiment by a drawing ring which comprises a central cylindrical chamber in which the cladding is fused to the core. An upper, outwardly extending flange on the ring attaches the ring to the furnace and a lower, inwardly projecting flange defines an aperture which forces the softened rods against the cladding when the assembly passes therethrough.

It is, therefore, included among the objects and advantages of the invention to provide a method for applying a low viscosity cladding glass to a glass mono fiber element.

Another object of the invention is to provide such a method of cladding a glass mono fiber element, in the drawing stage, by drawing a glass core having a cladding tube collapsed thereon and a plurality of low viscosity glass rods through a drawing ring which forces the low viscosity glass rods into a fused condition on the cladding tube.

Another object of the invention is to provide such a method of doubly cladding a glass core, at the mono drawing stage in a vacuum drawing furnace, to produce a fused assembly which is comprised of a glass cladding tube on the core along with a plurality of low viscosity glass rods on the surface of the cladding tube.

Further objects, advantages, and features of the invention will be apparent in the arrangement and construction of the constituent parts, in detail, as set forth in the following specification taken together with the accompanying drawing.

DETAILED DESCRIPTION OF THE PREFERRED EMBODIMENTS

Figure 2:
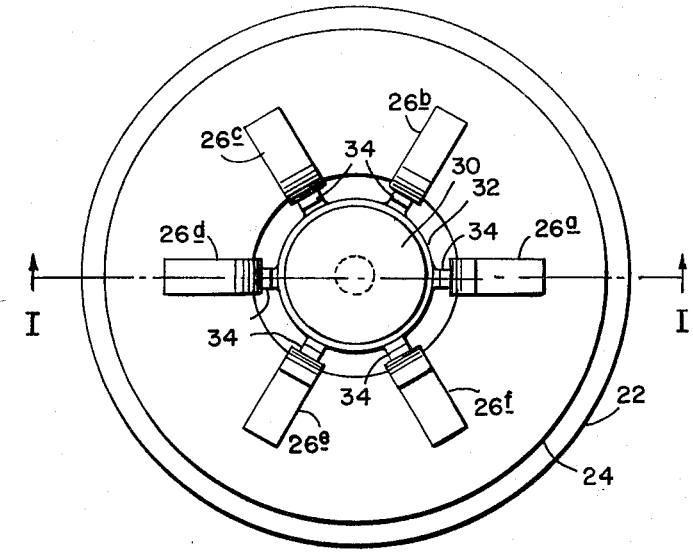
FIG. 2 is a plan veiw of a spacing ring for positioning the elements of a mono fiber assembly.

In referring to and describing the apparatus shown in the following figures of the drawing, like reference numerals will refer to identical parts of the apparatus.

Figure 1:
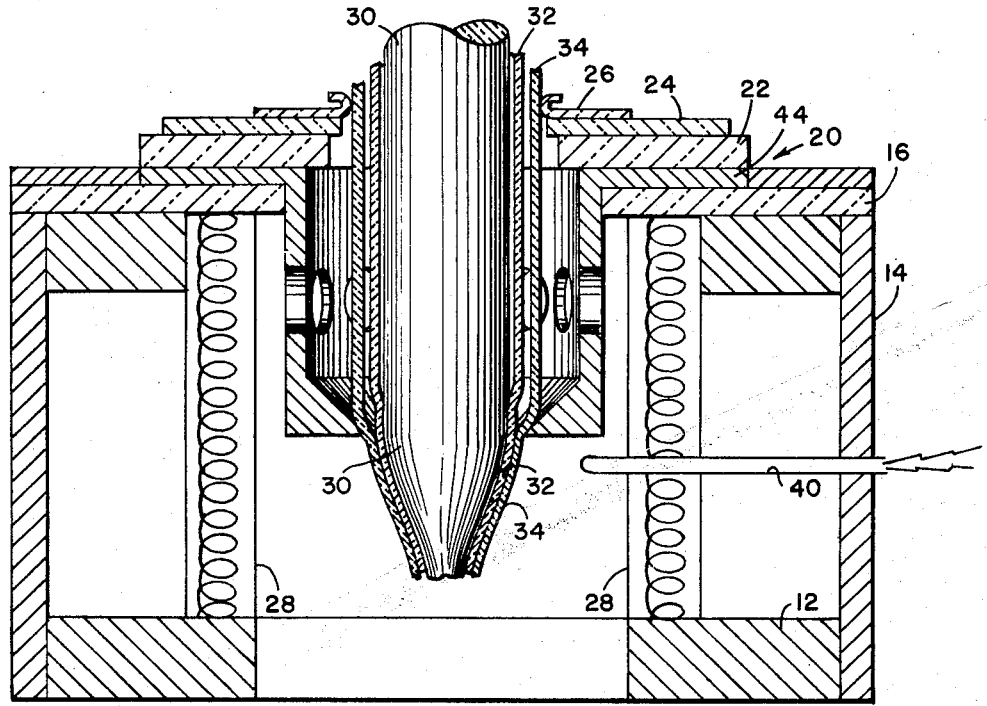
FIG. 1 is a generally schematic cross-sectional side elevational view of a drawing furnace, modified in accordance with the invention.
Figure 3:
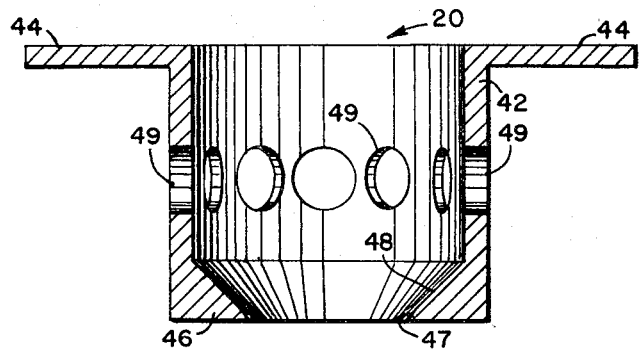
FIG. 3 is an enlarged cross-sectional, side elevational view of a drawing ring utilized in the apparatus of FIG. 1.

The apparatus which is illustrated in the various figures of the drawing provides a means for performing the method of forming a doubly clad glass mono fiber element which has a low viscosity outer cladding. Referring initially to FIGS. 1–3, there is shown a portion of a drawing furnace, generally designated by the reference numeral 10, including an apertured bottom ring 12, an outer wall 14, and a top portion 16. The top 16 is an annular member having a centrally located aperture therein which accommodates a flanged drawing ring which is designated, in general, by reference numeral 20. An annular insulating element 22 is seated on the outwardly extending flange 44 of the ring 20 and in turn provides a seat for a spacer ring 24 which supports a plurality of flat springs 26. The springs provide a means for regularly positioning and holding a like plurality of low viscosity glass rods 34 around a glass cladding tube 32. A glass core element 30 extends through the cladding tube 32. The springs are best shown in FIG. 2 which is a plan view of the spacing ring. The individual springs 26a through 26f are formed by curling back the free end thereof to form a bearing seat against which the individual glass rods are placed. The springs force the glass rods firmly against the cladding tube and hold them in regularly spaced positions around the tube.

A heating unit 28 is mounted within the drawing furnace 10 and surrounds the central throat through which the core-cladding-rod assembly passes during the drawing operation. The unit 28 supplies the thermal energy for raising the temperature of the various parts of the assembly to levels where fusion and drawing can occur. A thermocouple 40 provides a means for ascertaining the temperature in the furnace and for controlling it by means of a feedback system which is not shown.

The drawing ring 20 is shown enlarged and in detail in FIG. 3. The ring 20 includes a central, cylindrical body portion 42 having an outwardly extending upper flange 44 which seats on the furnace top 16 and a lower inwardly projecting flange 46 which terminates in an aperture 47. Preferably the aperture edge is a knife edge 47 at the lower end of a bevel 48. A series of holes 49 are drilled around the body portion 42 for admitting heat to the glass assembly to be drawn through the aperture.

In a particular application, the plurality of rods are formed of an acid soluble glass material. When packing a group of fibers having these rods fused to the outside of the cladding tube, the rods serve as spacers assuring that no contact occurs between adjacent claddings.

It should be noted that although this description sets forth the rods as being separated around the periphery of the tube, that the rods may be closely spaced in order to provide a complete secondary cladding.

In operation, the glass core 30 is telescoped into a glass cladding tube 32. A plurality of rods 34 of low viscosity glass are positioned around the exterior of the cladding tube 32. The glass assembly is inserted into a drawing furnace 10 and is positioned by the springs 26 on the spacer ring 24. The assembly is progressively heated from end to end as the assembly is lowered into the furnace. While the assembly is being heated, a vacuum is applied to the annulus between the core and the cladding tube. When the cladding glass reaches fusion temperature, the cladding tube collapses onto the core glass and becomes fused thereto. The cladding tube is collapsed against the core through a combination of two forces, the first is the force from drawing the vacuum in the annulus, providing about one atmosphere of force, and the second is the surface tension resulting from drawing down the core and tube.

As can be seen from FIG. 1, this collapsing of the cladding tube occurs before the assembly reaches the aperture 47, and thereby separates the cladding tube from the highly softened rods 34. This is due to the difference in softening temperatures of the cladding and the rods. The rods 34 soften first, due to their lower viscosity; however, they do not become fused to the tube at this time because the tube is still too hard for fusion to occur. Hence, the depth of the chamber is proportional to the softening temperature of the tube 32. When the tube 32 has softened and has been collapsed against the core 30, the bevel 48 which terminates in the knife-edge 47 progressively forces the softened rods 34 into fusion contact with the cladding 32. The opening 47 in the bottom of the drawing ring is made about 10 to 20% smaller than the overall dimension of the collapsed assembly being drawn through the unit, and further drawing through the furnace reduces the diameter of the fibers as is well known in the art.

Figure 4:
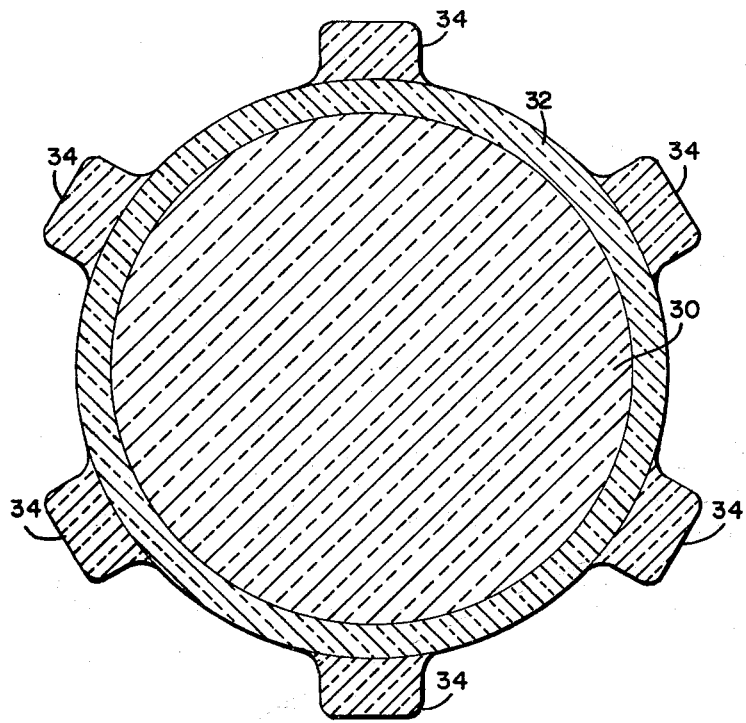
FIG. 4 is a greatly enlarged cross-sectional view of the resulting doubly clad glass mono fiber element.

The resulting fused assembly after being drawn down into a doubly clad glass mono fiber element by standard fiber drawing techniques is shown greatly enlarged in FIG. 4. As can be readily seen, the rods are fused to the cladding and have been somewhat flattened along the outer edge by the force applied by the knife-edge.

Therefore, it can be seen that the novel method of this invention produce a doubly clad glass mono fiber element which is not affected by blemishes caused by bubbles forming the core-cladding interface.

While there have been shown and described what are considered to be preferred embodiments of the present invention, it will be obvious to those skilled in the art that various changes and modifications may be made therein without departing from the invention.

I claim:

1. Apparatus for forming a doubly clad glass monofiber element having a low viscosity outer cladding comprising a drawing furnace for receiving and heating to fusion temperatures an assembly of a glass core in a glass cladding tube surrounded by a plurality of regularly circumferentially spaced rods of low viscosity glass, the rods being disposed in contact with the glass cladding tube, means for applying a vacuum to the annular space between the core and the cladding tube to collapse the tube onto the core when the cladding glass reaches its fusion temperature, means for mechanically forcing the rods into fusion contact with the cladding when the assembly reaches the fusion temperature of the low viscosity glass, and means for drawing the fused assembly into a doubly clad glass monofiber element, whereby during a single passage through the apparatus, both claddings may be applied to form the doubly clad glass monofiber element.

2. Apparatus according to claim 1, in which the means for mechanically forcing is a drawing ring which is supported by the furnace, the ring comprising a central, cylindrical body portion having a chamber therein in which the cladding is fused to the core, means for attaching the body portion to the furnace, and a lower, inwardly projecting flange at the opposite end of the body portion which defines an aperture which is smaller than the assembly, the rods being forced aganist the cladding and fused thereto when the assembly passes through the aperture.

3. Apparatus according to claim 2, in which the central, cylindrical body portion has a plurality of radial apertures therethrough for admitting energy to heat the assembly.

4. Apparatus according to claim 2, in which the aperture in the lower flange is defined by a knife-edge formed by downwardly converging the flange.

5. Apparatus according to claim 2, in which the length of the central, cylindrical body portion is proportional to the fusion temperature of the cladding glass.

6. Apparatus according to claim 2, which further includes means for regularly positioning and holding the plurality of rods around the cladding tube.

7. Apparatus according to claim 6, in which the means for positioning and holding comprises a like plurality of flat springs regularly spaced about an aperture in a plate which is attached to the upper flange, the springs each having their spring force acting radially inward.

References Cited

UNITED STATES PATENTS

| | | | |
|---|---|---|---|
| 1,926,552 | 9/1933 | Morgan | 65—DIG 7 |
| 3,224,851 | 12/1963 | Hicks, Jr. | 65—DIG 7 |
| 3,395,006 | 7/1968 | Hopkins et al. | 65—157 X |
| 3,615,313 | 10/1971 | Phaneuf | 65—DIG 7 |
| 3,625,669 | 12/1971 | Norton | 65—DIG 7 |
| 3,717,450 | 2/1973 | Loughridge et al. | 65—335 X |

FRANK W. MIGA, Primary Examiner

U.S. Cl. X.R.

65—DIG 4, 155, 157